United States Patent [19]

Merrill, Jr.

[11] Patent Number: 4,945,806
[45] Date of Patent: Aug. 7, 1990

[54] FIBER OPTIC MUSICAL INSTRUMENT DIGITAL INTERFACE

[76] Inventor: Raymond Merrill, Jr., 367 S. N St., Livermore, Calif. 94550

[21] Appl. No.: 300,288

[22] Filed: Jan. 19, 1989

[51] Int. Cl.$^5$ .......................... G02B 6/42; G10H 5/00; H04B 10/12; H04B 10/22
[52] U.S. Cl. ................................ 84/645; 250/227.11; 350/96.15; 350/96.2; 350/96.23; 455/608; 455/612; 455/617
[58] Field of Search ....................... 84/1.01, 1.16, 1.18; 250/227; 350/96.1, 96.15, 96.16, 96.2, 96.23; 455/600, 605, 608, 610–612, 617–619

[56] References Cited

U.S. PATENT DOCUMENTS

| | | | |
|---|---|---|---|
| 4,321,463 | 3/1982 | Stecher | 84/1.18 X |
| 4,442,750 | 4/1984 | Bowley | 84/1.18 |
| 4,715,671 | 12/1987 | Miesak | 84/1.01 X |
| 4,748,887 | 6/1988 | Marshall | 84/1.16 X |
| 4,831,662 | 5/1989 | Kuhn | 455/608 |
| 4,882,773 | 11/1989 | Maloney | 455/617 |

*Primary Examiner*—Stanley J. Witkowski
*Attorney, Agent, or Firm*—Henry P. Sartorio

[57] ABSTRACT

The fiber optic musical instrument digital interface (MIDI) is a converter that transforms electrical MIDI signals from an electronic musical instrument (or electronic musical device) into light signals. These light signals travel down a fiber optic cable to another fiber optic MIDI link where they are converted back into their original electrical form and output to another electronic musical instrument (or electronic musical device). The advantages of this type of communication between electronic musical instruments are electrical noise immunity, fast data transfer and long communication length.

11 Claims, 4 Drawing Sheets

FIBER OPTIC MUSICAL INSTRUMENT DIGITAL INTERFACE

BACKGROUND OF THE INVENTION

The invention relates generally to electronic musical instruments and more particularly to interfaces between electronic musical instruments.

The musical instrument digital interface (MIDI) is a digital communication protocol format for electronic musical instruments. This standard was created so that electronic musical instruments could talk to or communicate with and control other musical instruments, sound reinforcement devices, or computers.

Conventional MIDI connections between instruments are made by two electrical conductors in the form of a cable. This cable has resistance which affects the maximum communication distance. As the cable increases in length, so does the electrical resistance. The higher the resistance, the more susceptible the cable is to electromagnetic interference.

The electrical signals propagating through the cable are also affected by cable capacitance and inductance. These factors will also lead to a reduction in useable cable length. The current recommended maximum cable length is twenty five feet.

Accordingly, the standard MIDI has several limitations due to its electronic nature which restrict the ability to interconnect electronic musical instruments. An improved interface which eliminates these problems is desired.

SUMMARY OF THE INVENTION

It is an object of the invention to provide a method and apparatus for increasing digital communication length between electronic musical instruments.

It is also an object of the invention to improve digital communication quality by decreasing electrical noise susceptibility, It is another object of the invention to increase digital data propagation speed through the transfer medium.

It is a further object of the invention to provide an improved musical instrument digital interface (MIDI).

The invention is a fiber optic musical instrument digital interface (MIDI). An electric current from an electronic musical instrument in the form of a digital code is input into the interface and converted to a voltage signal which actuates a transmitter driver which is connected to a fiber optic transmitter to convert the electrical signal into a light signal. The light signal is transmitted through a fiber optic cable to a fiber optic receiver in another interface where the light signal is converted back to an electrical signal in the form of a digital code and output to another electronic musical device. The interface may be external to the instrument or may be built internally into the instrument.

DETAILED DESCRIPTION OF THE PREFERRED EMBODIMENTS

Figure 1:
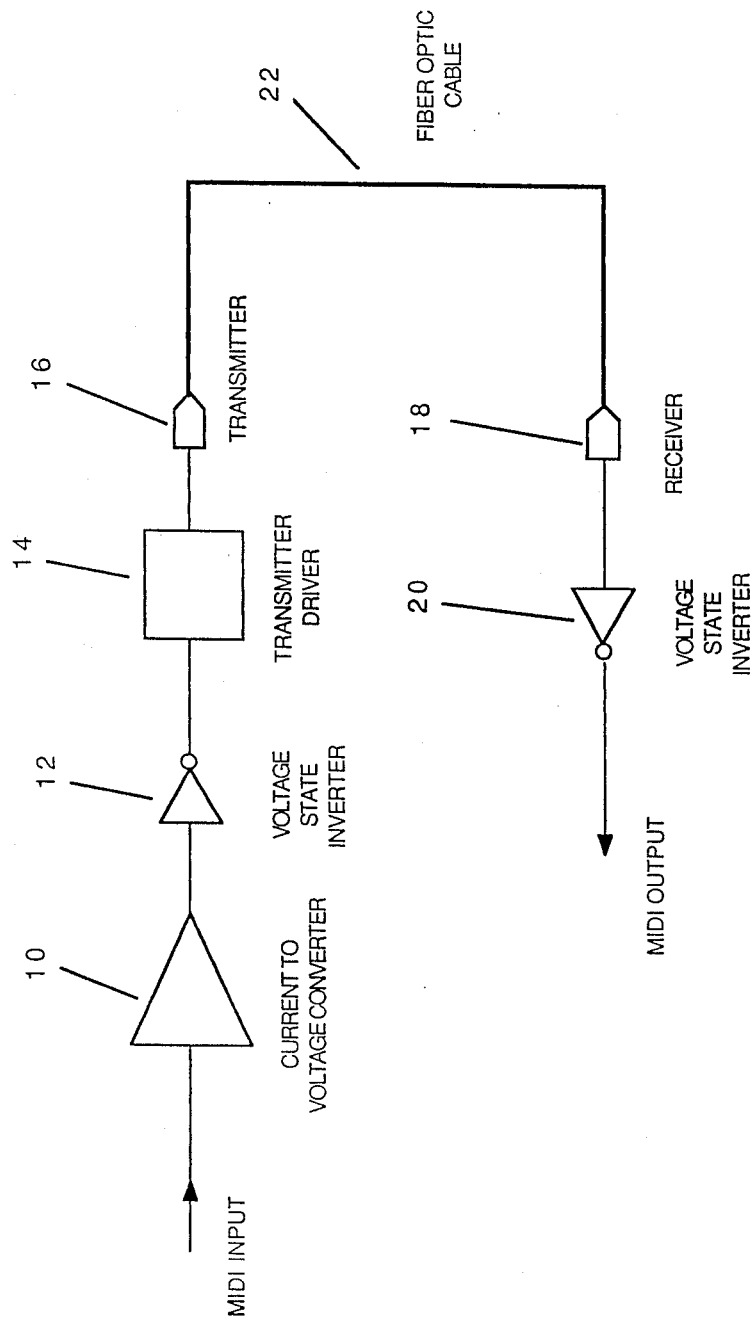
FIG. 1 is a block diagram of a fiber optic MIDI interface.

As shown in FIG. 1, an electric current from an electronic musical instrument representing digital information is input into current to voltage conversion means (converter) 10 which converts said current into a voltage. The voltage generated by converter 10 is input into voltage state inverter 12 to invert and buffer the voltage so that it can drive the transmitter driver 14. Driver 14 generates an electric current capable of driving the fiber optic transmitter 16. The transmitter 16 generates light impulses which travel down the fiber optic cable 22 to a receiver 18 which generates an electric voltage which is input into voltage state inverter 20 which inverts and buffers the signal. The final electrical signal from inverter 20 is then output to another electronic musical instrument which interprets the digital information. Transmitter 16 and receiver 18 are conventional electro-optical components typically utilizing LED's and phototransistors respectively. Thus an electrical MIDI signal (an electrical signal in MIDI format) from an electronic musical instrument is converted to an optical signal which is transmitted through an optical fiber and then converted back to an electrical MIDI signal.

Figure 2A:
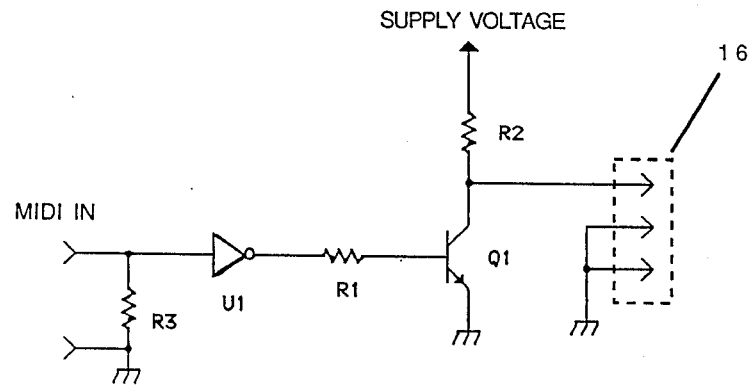
FIGS. 2A and 2B are schematic diagrams of the transmitter circuit, and receiver circuit, respectively.
Figure 2B:
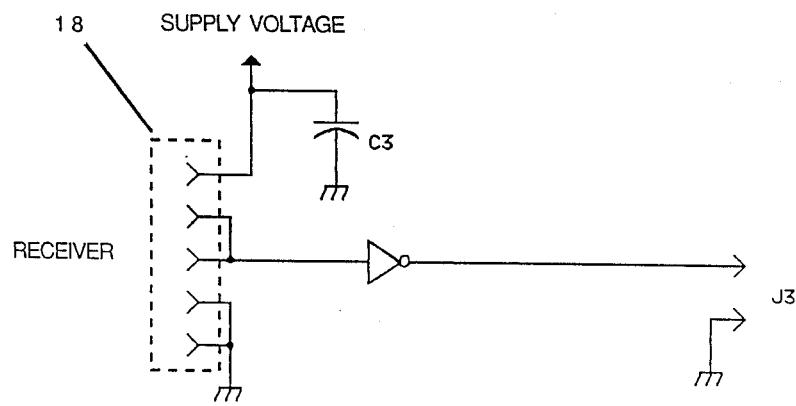

An illustrative embodiment of particular circuitry to implement the interface is shown in FIGS. 2A and 2B. As shown in FIG. 2A, the transmitter circuit is made of input connector J2 with resistor R3 connected in parallel across the input. Resistor R3 forms the current to voltage conversion means 10 of FIG. 1. The voltage dropped across R3 is input to the inverter U1. Inverter U1 forms the voltage state inverter 12 of FIG. 1. The output voltage of U1 is dropped across resistor R1 and the base to emitter junction of transistor Q1. The resulting current flow into transistor Q1 is amplified in the collector circuit thus producing a voltage drop across resistor R2. The components R1, Q1 and R2 form the transmitter driver 14 of FIG. 1. When Q1 is "off", no current flows in the base or collector circuit and the transmitter 16 of FIG. 1 is driven by the source (supply) voltage through resistor R2. When Q1 is "on", current from supply voltage flows through transistor Q1 and transmitter 16 turns off. When the transmitter 16 is on, light is generated. This light propagates through fiber optic cable 22 of FIG. 1, thus delivering the transmitter light to receiver 18 of FIG. 1. The output of receiver 18 is connected to the input of voltage state inverter 20 of FIG. 1. As light is received, the receiver 18 generates a voltage which is inverted by the voltage state inverter 20 thereby reproducing an electrical signal which matches the MIDI input signal. As shown in FIG. 2B, the receiver circuit includes receiver 18 followed by inverter U2 which forms the voltage state inverter 20 of FIG. 1. Inverter 20 is required where receiver 18 itself produces an inverted signal i.e. no voltage when a light signal is received. Inverter U2 has sufficient drive capability to serve as a driver for the output of the system which is obtained from output connector J3. Capacitor C3 provides supply filtering for the receiver.

Figure 3A:
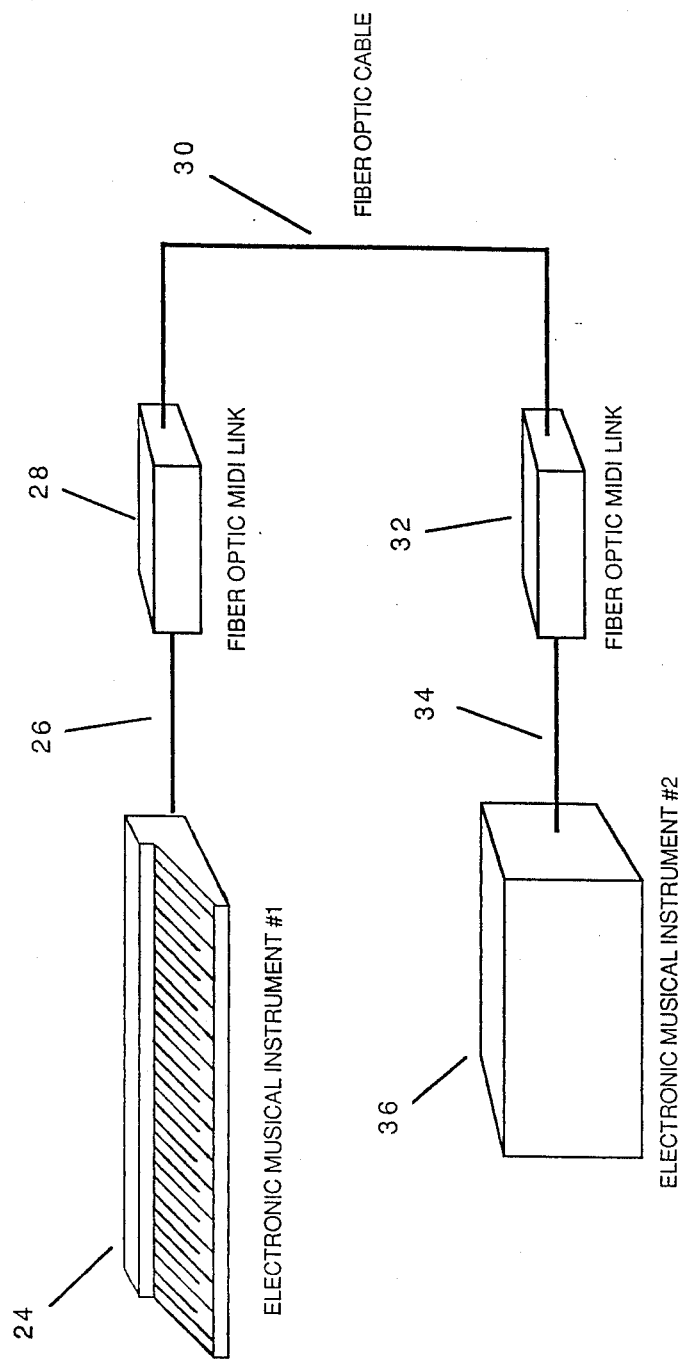
FIGS. 3A and 3B are perspective views of a musical system interconnected tusing external and internal fiber optic MIDI interfacing, respectively.

The fiber optic MIDI interface may be implemented either externally or internally. As shown in FIG. 3A, an electronic musical instrument 24 which produces a digital electronic signal is connected by electrical MIDI cable 26 to external fiber optic link (interface) 28. Fible optic link 28 is connected by fiber optic cable 30 to a second external fiber optic link (interface) 32 which is connected by electrical MIDI cable 34 to a second electronic musical instrument 36. Fiber optic cable 30 is connected to fiber optic links 28, 32 by suitable connection means. In operation, the electrical signal from instrument 24 is transmitted by cable 26 to link 28 where the signal is converted to an optical signal. The optical signal is transmitted over fiber optic cable 30 to link 32 where is optical signal is converted back to an electrical signal which is transmitted by electrical cable 34 instrument 36.

Figure 3B:
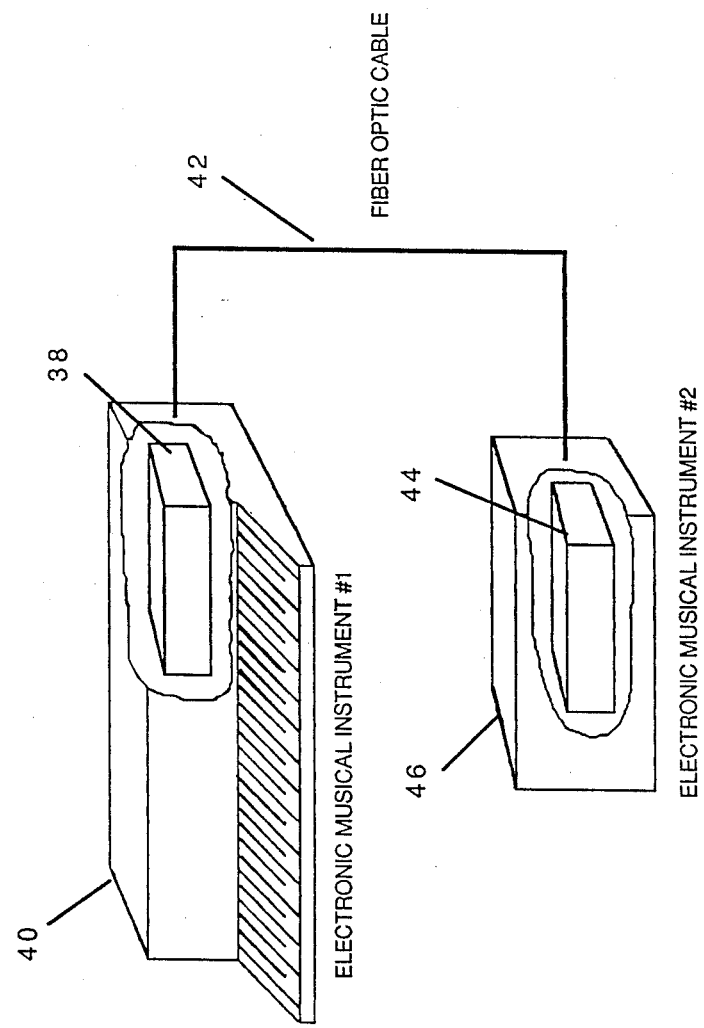

In an alternate embodiment, as shown in FIG. 3B, fiber optic link (interface) 38 is built internal to electronic musical instrument 40 so that the electronic signal produced by the instrument is input into the link and converted to an optical signal. Link 38 is connected by fiber optic cable 42 to fiber optic link 44 in electronic musical instrument 46. A combination of internal and external interfaces may be used, i.e. connecting an instrument with internal fiber optic interface to an instrument with external fiber optic interface. Two instruments can be connected, or an instrument and another device such as a sound reinforcement device or a computer. A second connection back through the fiber optic MIDI's from the second instrument to the first instrument can also be made for full two-way communication. Each MIDI unit has both a transmitter and receiver to permit two-way use. Units with only a transmitter or receiver could be provided for dedicated one-way applications. The length of the fiber optic cable is limited only by the optical loss inherent in the cable, the transmitter output power and the receiver sensitivity. Data links as long as five kilometers are achievable while conventional electrical MIDI cable links are limited to very short lengths (fifty feet or less).

Changes and modifications in the specifically described embodiments can be carried out without departing from the scope of the invention which is intended to be limited only by the scope of the appended claims.

I claim:

1. An interface for electronic musical instruments and the like which generate and respond to digital electronic signals in the MIDI format, comprising:
   a transmitter circuit for producing an optical signal from a digital electronic signal in MIDI format, comprising:
      input connector means for inputting a digital electronic signal in MIDI format;
      optical signal generation means for converting the digital electronic signal into an optical signal;
      fiber optic connector means for connecting the output of the transmitter circuit to a fiber optic cable; and
   a receiver circuit for producing a digital electronic signal in the MIDI format from an optical signal, comprising:
      fiber optic connector means for connecting the receiver circuit to the fiber optic cable;
      optical signal conversion means for converting the optical signal back to a reconstructed digital elecronic signal in MIDI format;
      output connector means for outputting the reconverted digital electronic signal in the MIDI format;
   wherein the optical signal generation means comprises:
      a current to voltage converter;
      a voltage state inverter connected to the output of the converter;
      a transmitter driver connected to the output of the inverter;
      an electro-optical transmitter connected to the output of the driver; and
   the optical signal conversion means comprises:
      an electro-optical receiver;
      a voltage state inverter connected to the output of the receiver.

2. The interface of claim 1 further comprising a fiber optic cable connected between the transmitter circuit and receiver circuit.

3. The interface of claim 1 wherein at least one of the receiver and transmitter circuits is external to the electronic musical instruments.

4. The interface of claim 1 wherein at least one of the receiver and transmitter circuits is internal to the electronic musical instruments.

5. The interface of claim 1 wherein the transmitter circuit is electrically connected to a first instrument and the receiver circuit is electrically connected to a second instrument.

6. The interface of claim 5 further comprising a second transmitter circuit electrically connected to the second instrument and a second receiver circuit electrically connected to the first instrument.

7. An electronic music system comprising:
   a first electronic musical device which produces a digital electronic signal in MIDI format;
   a first fiber optic link electrically connected to the first device for receiving a digital electronic signal in MIDI format from the first device and converting the electronic signal into an optical signal;
   a fiber optic cable connected to the first link;
   a second fiber optic link connected to the fiber optic cable for receiving the optical signal and converting the optical signal back to a reconstructed digital electronic signal in MIDI format;
   a second electronic musical devices electrically connected to the second link of receiving the reconstructed digital electronic signal in MIDI format;
   wherein the first link comprises:
   a transmitter circuit for producing an optical signal from a digital electronic signal in MIDI format, comprising:
      input connector means for inputting a digital electronic signal in MIDI format;
      optical signal generation means for converting the digital electronic signal into an optical signal;
      fiber optic connector means for connecting the output of the transmitter circuit to a fiber optic cable;
   and the second link comprises:
   a receiver circuit for producing a digital electronic signal in the MIDI format from an optical signal, comprising:
      fiber optic connecetor means for connecting the receiver circuit to the fiber optic cable;
      optical signal conversion means for converting the optical signal back to a reconstructed digital electronic signal in MIDI format;
      output connector means for outputting the reconverted digital electronic signal in the MIDI format; and
   wherein the optical signal generation means comprises:
      a current to voltage converter;
      a voltage state inverter connected to the output of the converter;

a transmitter driver connected to the output of the inverter;

an electro-optical transmitter conected to the output of the driver; and the optical signal conversion means comprises:

an electro-optical receiver;

a voltage state inverter connected to the output of the receiver.

8. The system of claim 7 wherein the first and second electronic musical devices are selected from electronic musical instruments, and reinforcement devices, and computers.

9. The system of claim 7 where at least one of the first and second links are external to the respective first and second musical devices.

10. The system of claim 7 wherein at least one of the first and second links are internal to the respective first and second musical devices.

11. The system of claim 7 wherein the first link further comprises a second receiver circuit and the second link further comprises a seocnd transmitter circuit.

* * * * *